Figure 1:
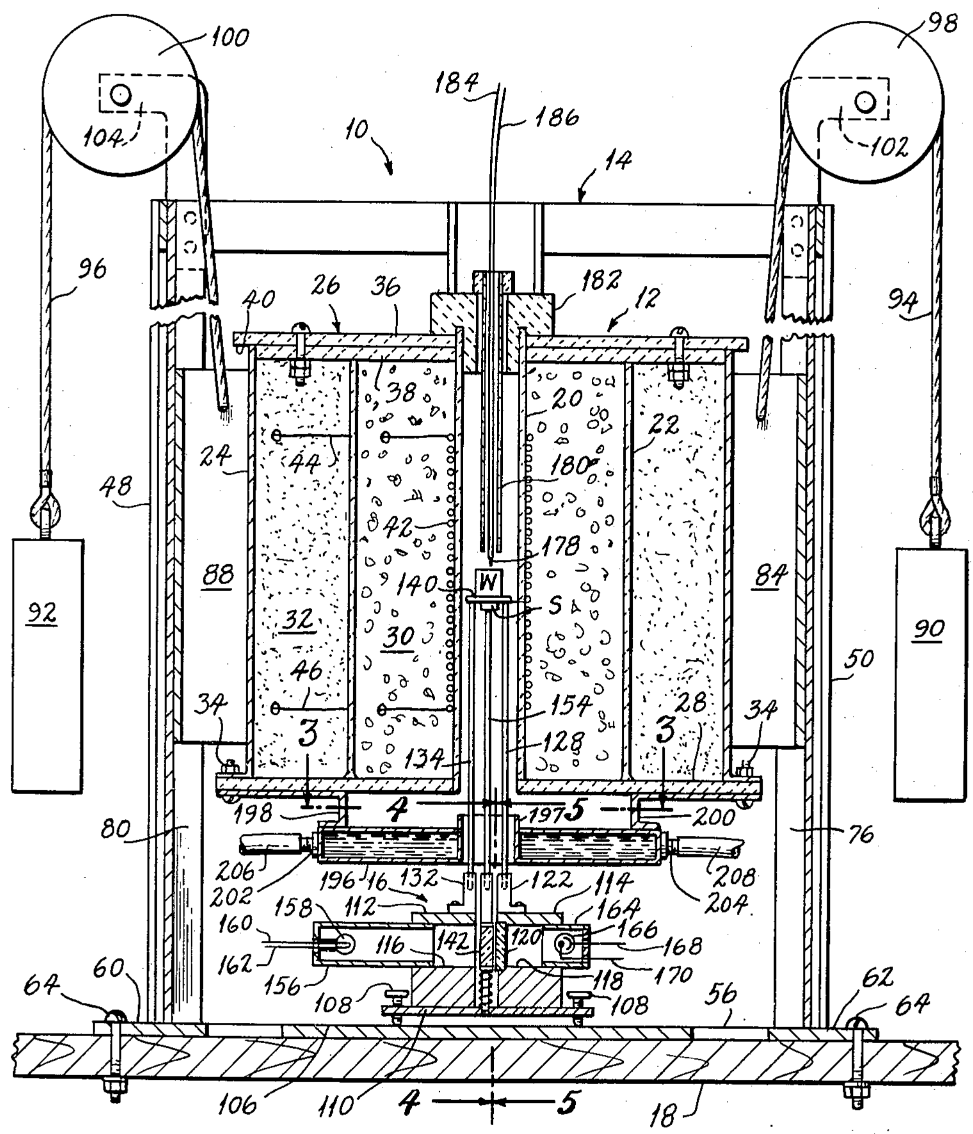

April 22, 1958 W. B. CRANDALL ET AL 2,831,340

SELF-CALIBRATING DILATOMETER FOR HIGH TEMPERATURE USE

Filed July 16, 1952 3 Sheets-Sheet 1

INVENTORS
WILLIAM B. CRANDALL
ALVIN LIEBERMAN
BY
D. C. Snyder
Roderick B. Jones
THEIR ATTORNEYS

SELF-CALIBRATING DILATOMETER FOR HIGH TEMPERATURE USE

Filed July 16, 1952 3 Sheets-Sheet 2

INVENTORS
WILLIAM B. CRANDALL
ALVIN LIEBERMAN
BY D. G. Snyder
Roderick B. Jones
THEIR ATTORNEYS April 22, 1958 W. B. CRANDALL ET AL 2,831,340
SELF-CALIBRATING DILATOMETER FOR HIGH TEMPERATURE USE
Filed July 16, 1952 3 Sheets-Sheet 3
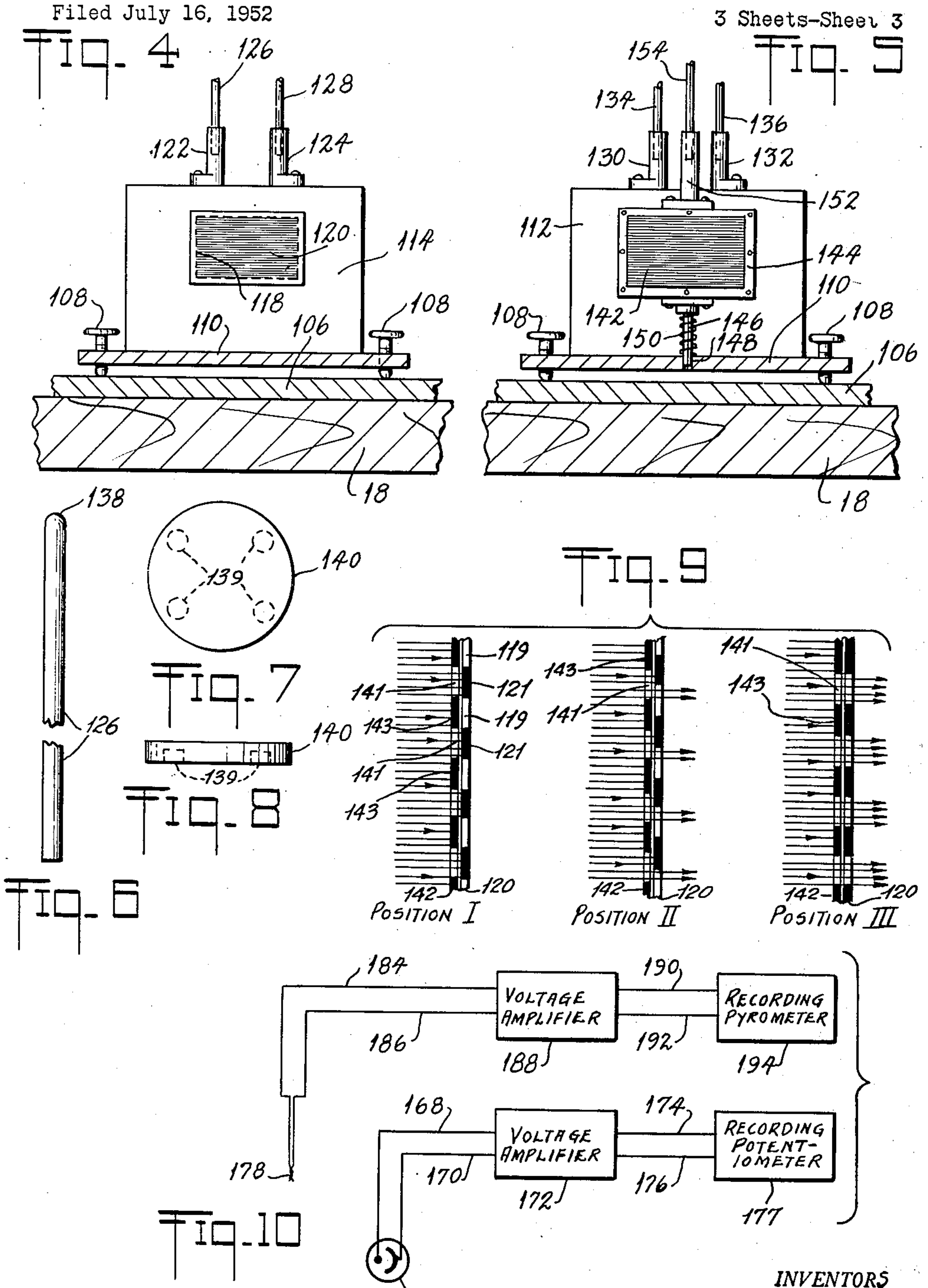
INVENTORS
WILLIAM B. CRANDALL
ALVIN LIEBERMAN
BY
THEIR ATTORNEYS 2,831,340

SELF-CALIBRATING DILATOMETER FOR HIGH TEMPERATURE USE

William B. Crandall, Alfred, and Alvin Lieberman, Wellsville, N. Y., assignors, by mesne assignments, to the United States of America as represented by the Secretary of the Navy Application July 16, 1952, Serial No. 299,262

5 Claims. (Cl. 73—16)

This invention pertains to the art of dilatometers and the like instruments for measuring dimensional change of a sample of solid material.

The invention is embodied in apparatus that is operable to measure motions accurately in the order of $5\times10^{-6}$ inches and less through a total possible range of at least 0.05 inch. The instrument of the present invention is particularly adapted for use with samples that are being subjected to high temperatures, and operates accurately to measure dimensional changes of a sample in a temperature range at least as high as 1400° C.

Figure 2:
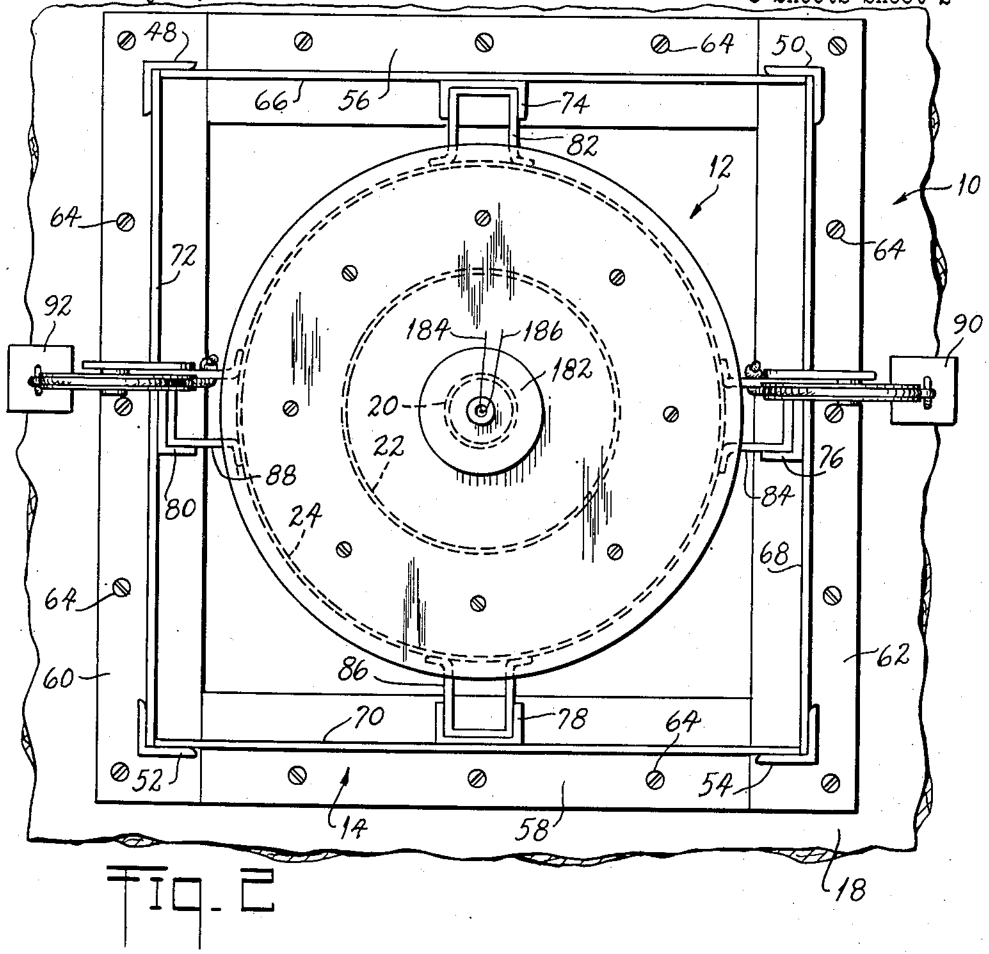
Figure 3:
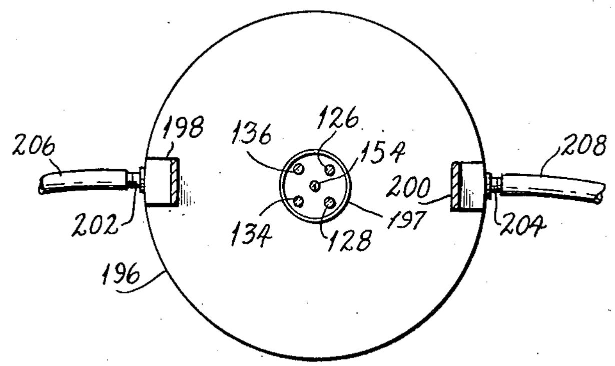

One practical embodiment of the invention is disclosed in the accompanying drawings, from which the principles of the invention will be understood more clearly. In the drawings:

Fig. 1 is a cross-sectional elevation, taken on a vertical center-plane of apparatus embodying the invention, Fig. 2 is a plan of the apparatus of Fig. 1, Fig. 3 is a horizontal cross-sectional view, taken along the line 3—3 of Fig. 1, Fig. 4 is a cross-sectional elevation, taken along the line 4—4 of Fig. 1, Fig. 5 is a cross-sectional elevation, taken along the line 5—5 of Fig. 1, Fig. 6 is a detail elevation of sapphire support rods, Fig. 7 is a detail plan of the abutment or table piece, Fig. 8 is an elevation of the abutment piece of Fig. 7, Fig. 9 illustrates diagrammatically the light metering that measures linear displacement, and Fig. 10 is a block diagram representation of electrical circuits in the apparatus of Fig. 1.

Apparatus of the dilatometer embodying the present invention, indicated generally at 10, comprises muffle furnace 12, Fig. 1, which is supported by frame 14 that rests on the top surface of member 18, which may be a table top, for example. Furnace 12 contains a sample or specimen S of a material that is a solid, the dimensional change of which is to be measured. Specimen S is supported in position inside the furnace 12 by means of measuring apparatus 16, which also rests on the top surface of table top 18.

Muffle furnace 12 is cylindrical in shape, and comprises an inner cylindrical refractory muffle or baffle 20, exteriorly of which there is a first or intermediate concentric refractory linear 22, and a second or outer concentric cylinder 24, the latter preferably being of stainless steel. The several cylindrical walls 20, 22 and 24 are held and concentrically arranged as shown between upper and lower heat-resistant discs 26, 28, respectively, to provide respective inner and outer chambers 30 and 32 containing heat-resistant insulation. Under preferred practice, inner chamber 30 contains aluminum oxide ($Al_2O_3$), and magnesium oxide (MgO) is contained in outer chamber 32.

The lower heat-resistant disc 28 is fixed to a flange at the lower end of outer cylinder 24, for example, by means of bolts 34. The upper heat-resistant disc 26 preferably forms a lid, which is made of two concentric upper and lower members 36 and 38 secured to each other lower member 38 being somewhat smaller in diameter, and thereby providing a peripheral shoulder 40 which rests against the upper end or edge of the outer concentric cylinder 24. The upper and lower discs 26 and 28 are centrally apertured so as to embrace the outer surface of the inner muffle 20 at its end. Muffle 20 is a central tube of furnace 12 that permits ready access to the center of the furnace, from either the top or the bottom.

The outer surface of the muffle 20 is wound with an electric heating element 42, preferably of platinum or rhodium, and the ends thereof are connected to wires 44 and 46, which pass through the walls of intermediate liner 22 and outer cylinder 24, and constitute a line to a suitable source of electrical power, not shown.

Supporting framework 14 comprises four upright angle-iron corner pieces 48, 50, 52 and 54, Fig. 2. Base plates 56, 58, 60 and 62 are secured to each other, by welding for example, to form a flat, rectangular base that is secured to table top 18 by means of bolts 64. Upright corner pieces 48, 50, 52 and 54 are secured to the base at the respective corners thereof, also by welding. The corner pieces 48, 50, 52 and 54 are held rigidly in place at their upper ends by means of strap-iron brace members 66, 68, 70 and 72 being welded in position to form the respective four sides of the rectangle. Between each of the brace members 66, 68, 70 and 72 and its corresponding base plates 56, 62, 58 and 60, channel irons 74, 76, 78 and 80 are welded in vertical positions, respectively at the midpoints of the several sides of the rectangle, and these comprise guideways or tracks for vertical movement of furnace 12. U-shaped guide members or shoes 82, 84, 86 and 88 are secured to the outer surface of cylinder 24 to extend lengthwise thereof at points spaced apart 90° from each other circumferentially, and they project radially into the respective guideways of channel irons 74, 76, 78 and 80, furnace 12 thereby being movable alternatively up and down within the framework 14.

The counterbalance comprising weights 90 and 92 are attached to the respective guide members or shoes 84 and 88 by means of the respective ropes 94 and 96 which travel over pulleys 98 and 100 respectively. The pulleys 98 and 100 are journalled in the respective brackets 102 and 104, which are secured to and extend upwardly and outwardly from the supporting framework 14. This enables furnace 12 to be lifted manually to a position above and away from sample S, and alternatively lowered to position the sample inside the furnace.

Measuring apparatus 16 is centrally located beneath the furnace 12, and comprises a rectangular metallic base or rest plate 106, which is secured to or fixed on the table top 18 to provide a hard level surface on which the table 110 rests to support the specimen S. The four legs 108 of table 110, one at each corner thereof, are screw-threaded to adjust the level of the table.

Boxes 112 and 114 rest on table 110 in positions opposite each other and with a space between them. Stands 122 and 124, Fig. 4, are secured to the top of box 114, and stands 130 and 132 are secured in a similar manner to the top of box 112 as seen in Fig. 5. Each stand 122, 124, 130 and 132 is recessed to receive each its corresponding rod 126, 128, 134 and 136, respectively and each stand holds its rod in upright position and projecting upwardly into the inner tube 20 of furnace 12, as seen in Fig. 1.

The several rods 126, 128, 134 and 136 are alike, and are cylindrical as seen in Fig. 6, the upper end of each rod being rounded semi-spherically at 138. Rods 126, 128, 134 and 136 preferably are made of sapphire because of its resistance to heat, and its resistance to deformation and warping when subjected to heat.

Abutment plate 140 in the form of a disc, Figs. 7 and 8, rests on top of the upright rods 126, 128, 134 and 136, and comprises four sockets or recesses 139, one for each of the rods. The upper end 138 of each rod is projected into its corresponding recess 139 of disc 140, and thereby is held in position. Disc 140 holds the rods 126, 128, 134 and 136 rigidly in upright position, which preferably is vertical, and the several rods thus are positioned parallel to each other. Abutment plate 140 also is made of sapphire to inhibit distortion and warping when heated.

A fifth rod 154, also of sapphire, extends downwardly from abutting engagement with abutment plate 140, and is projected upwardly from below by an actuating device into bearing engagement against the bottom surface of the plate. Stem 146 is secured to the bottom of frame 144, and projects downwardly into bore 148 of table 110 that serves as a guideway for stem 146. Compression spring 150 contains the stem 146, and is tensioned between table 110 and the frame 144 to constitute the actuating device that presses rod 154 upwardly against plate 140. Stand 152 at the top of frame 144 is recessed to hold rod 154 upright in position to engage the bottom surface of abutment plate 140, rod 154 being held vertical and parallel with rods 126, 128, 134 and 136.

Specimen S is positioned against the bottom surface of plate 140 as seen in Fig. 1, at the center of the plate between the several sockets 139, and the top end of rod 154 presses against the specimen from below and holds it pressed against the bottom surface of disc 140.

A weight W is rested on the top surface of disc 140, and is heavy enough to counterbalance and compress spring 150. Thus, specimen S is held against the bottom surface of disc 140 by the opposed forces of weight W and spring 150.

The operation of supporting specimen S in the manner described, and as seen in Fig. 1, is performed while the furnace is in its raised position in frame 14, not shown. Screw-threaded legs 108 of table 110 are adjusted to locate the disc 140 level and along the axis of tube 20. Furnace 12 now is lowered along guideways 74, 76, 78 and 80 of frame 14 to project disc 140 relatively upwardly into the furnace, and locate specimen S at the center of the furnace where the heat is most intense.

By specimen S being positioned in bearing engagement with abutment plate 140 as described and shown, frame 144 is located in the space between the boxes 112 and 114, opposite and in line with both cavities 116 and 118 of the respective boxes, the cavities also being in line with each other.

Frame 144 contains a grating or light screen 142, which comprises lines 141, Fig. 9, that are translucent, alternating with lines 143 that are opaque. In the disclosed embodiment, screen 142 is a panel of transparent glass, on which opaque lines 143 of uniform thickness are scribed and etched, the opaque lines being spaced apart uniformly between translucent lines 141 of uniform thickness. Thus, all the lines 141 and 143 are parallel to each other, and also are directed in frame 144 to be disposed transversely to the direction of rod 154, which is positioned parallel to the rods 126, 128, 134 and 136.

In the face of box 114 that is proximate to frame 144, a like grating or light screen 120 is positioned in cavity 118, and is disposed adjacent to and face-to-face with screen 142. Screen 120 also consists of a pane of transparent glass on which opaque lines 121 are scribed and etched, to constitute alternate translucent lines 119 and opaque lines 121. The lines 119 and 121 of screen 120 are the same in dimension and arrangement as the lines 141 and 143 of screen 142, and are directed transversely of the direction of rods 134 and 136. Thus, all the translucent and opaque lines 119 and 141, 121 and 143, respectively, of both screen 142 and 120, respectively, are parallel with each other.

Screen 120 is stationary, and is fixed with reference to the position of specimen S. Accordingly, if specimen S becomes dilated, and expands volumetrically, rod 154 is actuated to push screen 142 downwardly opposed by spring 150. Conversely, if specimen S shrinks or contracts volumetrically, spring 150 actuates rod 154 upwardly into continued pressing engagement with the specimen, and screen 142 is raised accordingly. This movement of screen 142, though slight, is measurable accurately by means of the screens 142, 120, as described.

As seen in Fig. 9, position I, opaque lines 143 of screen 142 may be opposite to and register with translucent lines 119 of screen 120, opaque lines 121 of screen 120 at the same time being between opaque lines 143, and opposite and in registry with, translucent lines 141 of screen 142. Light transfer through screens 142 and 120 is blocked thereby. When screen 142 moves by lengthwise movement of rod 154, portions of translucent lines 141 and 119 of respective screens 142 and 120 are in registry with each other, premitting light to penetrate through the screens. With continued movement of screen 142, the condition is attained in which translucent lines 141 and 119 register with each other completely, and opaque lines 143 and 121 also register with each other, as illustrated in position III, allowing maximum light penetration through screens 142 and 120. Position II illustrates the intermediate condition described hereinbefore, when approximately half the maximum light penetrates through screens 142 and 120.

Means is provided to measure the quantity of light that penetrates through the gratings or screens 142 and 120 at any position of screen 142 within the range of its movement. Tube 156 is fitted into the cavity 116 of box 112, at the end thereof remote from screen 142, and constitutes a housing that encloses an electric lamp 158, which is energized by a regulated voltage supply, not shown through leads 160 and 162 to provide a source of illumination having constant light intensity. Light from the source 158 is directed through cavity 116 and through screens 142 and 120 into cavity 118 of box 114.

Housing 164 is fitted into cavity 118 at its end remote from screen 120, and contains a photo-electric voltage-generator device 166 for measuring the intensity of light from the lamp 158 that is received through the gratings or screens 142 and 120. The output of the photo-electric device 166 is connected by wires 168 and 170 to a voltage amplifier 172, Fig. 10, and the output of the amplifier is connected by wires 174 and 176 to a suitable recording potentiometer 177, which produces a continuous record of the amplified output of photo-electric device 166, which corresponds directly with the intensity of light from light source 158 that penetrates through both screens 142 and 120, and this constitutes a measurement of linear displacement of screen 142 in the direction of rod 154, as also a measurment of dimensional change of specimen S.

Water jacket 196 is supported under furnace 12 and above the rod supporting stands 122, 124, 130 and 132, by means of brackets 198 and 200, which are secured to the bottom panel 28 of the furnace by means of bolts 34. Water enters jacket 196 through nipple 202 from inlet hose 206, and leaves through nipple 204 and exhaust hose 208, the water exteriorly of jacket 196 passing through a suitable circulating and cooling system, which is not shown.

Water jacket 196 is disc shaped, as seen in Fig. 3, and comprises a centrally located tubular wall 197 through which the sapphire rods 126, 128, 134, 136 and 154 extend from the boxes 112 and 114 and frame 144 to abutment disc 140 and specimen S. Water jacket 196 provides a heat-insulating baffle between furnace 12 and the light-measuring apparatus 16, and inhibits heat transfer from furnace 12 to componetns of light-measuring apparatus 16, thereby avoiding a tendency towards thermal expansion or warping.

Jacket 196 also constitutes a barrier of heat insulation, beyond which rods 126, 128, 134, 136 and 154 are protected from direct contact with heat from furnace 12. Heat engagement with the several rods 126, 128, 134 and 136 is uniform for uniform portions of their lengths, and thermal expansion of these rods is the same. The difference in length of rod 154 that is subjected to heat, measurable by the thickness of specimen S and the depth of sockets 139, is slight with reference to the total length that is subjected to heat, and generally negligible. The coefficient of thermal expansion of sapphire that is the material of rod 154 is a known quantity, and the difference of thermal expansion of rod 154 compared with rods 126, 128, 134 and 136 may be computed mathematically if desired to avoid any error that might be appreciable. Thus, thermal expansion is eliminated as a possible source of error in measuring the dimensional change of specimen S as herein disclosed.

A thermocouple 178 is positioned within the furnace 12 near the position of specimen S and operates to measure the temperature thereof when the furnace is in operation. Thermocouple 178 is held in place within a refractory tube 180, and thereby fixed to plug 182 that is contained in the upper opening of the muffle 20, and holds thermocouple 178 projected downwardly into position proximate to specimen S. Plug 182 closes the upper opening of tube 20, and reduces the loss of heat by convection. Lead wires 184 and 186 of the thermocouple 178 are connected to a voltage amplifier 188, Fig. 10, which, in turn, is connected by wires 190 and 192 to recording pyrometer 194, which produces a continuous record of the temperature within the furnace 12 coinciding as to time interval with the record by potentiometer 177.

*Operation*

Muffle furnace 12 first is pushed upwardly in its frame 14 above and away from the location for specimen S, which now is positioned between the underside of the sapphire abutment disc or table piece 140 and the top of the push rod 154. A weight W now is placed in the position shown on table piece 140, and is heavy enough to depress push rod 154 against the tension of spring 150, which actuates the rod to hold specimen S pressed against disc 140 as shown. Gratings 142 and 120 are aligned properly, and legs 108 of table 110 are adjusted, if necessary, to level disc 140, and to set rods 126, 128, 134 and 136 vertically to travel into the center tube 20 of furnace 12, which now is pushed downwardly over the specimen S, to the position shown in Fig. 1. Next, the heating element 42 is energized.

As the temperature within furnace 12 rises, the sapphire support rods 126, 128, 130, 132, and the sapphire push-rod 154 expand, but it is to be noted that the expansion of the several rods is self-compensating, except for any error resulting from rod 154 being shorter by the thickness of specimen S, which error may be corrected mathematically as described hereinbefore.

With the apparatus set up for a test in the manner described and shown, it operates automatically to produce a continuous record of voltage readings on potentiometer 177, Fig. 10, that constitute an accurate measurement of dimensional variation of specimen S. The apparatus is operable continuously and without attendance over a long period of time, during which time pyrometer 194 produces a continuous record of temperature coordinated with the same time interval of records by potentiometer 177.

As seen in Fig. 9, a light-transmission cycle of linear displacement of screen 142 is determined by the distance between adjacent opaque lines 143 of the screen, or in other words, by the number of opaque lines 143 and 121 per inch.

In a cycle that begins with minimum light transmission, illustrated by position I when opaque lines 143 and 121 of each of the respective screens 142 and 120 are adjacent to and cover translucent lines 119 and 141 respectively of the other respective screens 120 and 142, linear displacement of frame 144 caused by dimensional expansion of specimen S will produce progressively increasing light transmission to attain and pass the condition of position II until a condition of maximum light transmission is reached that corresponds with position III. Thereafter, during continued dimensional expansion of specimen S, light transmission will diminish progressively until a new coincidence of opaque and translucent lines occurs, as appears in position I. Obviously, however, measurement of dimensional changes of specimen S may begin at any point of a given light-transmission cycle, and may continue through one or more successive cycles.

In the actual structure of disclosed screens 142 and 120, 200 opaque lines 143 and 121 per inch are inscribed and etched, each line having a uniform thickness of 0.0025 inch. Accordingly, linear translation of screen 142 through a single complete cycle of light transmission corresponds to a total movement of 0.005 inch. By use of the voltage amplifier 172 and recording potentiometer 177 connected to the pick-up photo-electric device 166, as shown in Fig. 10, it is possible to make accurate interpolations to $5 \times 10^{-6}$ inches.

A variation from a maximum to a minimum light intensity will always correspond to a 0.0025 inch movement of push rod 154. The absolute magnitude of the light intensities is inconsequential, because each time a maximum and a minimum are recorded, the apparatus will have calibrated itself. It is a simple matter to interpolate to one part in a thousand between any maximum and the succeeding minimum. Thus, a motion of $2.5 \times 10^{-6}$ inches can be recorded without the necessity for calibrating. This constitutes the self-calibrating aspect of the invention.

Although gratings or screens 142 and 120 which have 200 lines per inch actually were used and prove satisfactory, gratings having 500 or even 1000 lines per inch could be made, in accordance with known techniques, and the sensitivity of the instrument could be increased or enhanced accordingly if desired.

The disclosure presents one practical embodiment of the invention. The scope of the invention is determined by the accompanying claims.

We claim:

1. In apparatus for measuring dimensional variations of a specimen of solid material, a rigid base, a plurality of fixed rods of like length bearing on the base and projecting upright from the base alongside each other, an abutment plate bearing on the rods and resting on the top ends thereof, a movable rod positioned alongside the fixed rods, the upper end of the movable rod bearing against the bottom of the abutment plate with a specimen of the material between the abutment plate and rod end, an actuating device pressing at the lower end of the movable rod to hold its upper end in bearing engagement with the specimen, and a measuring device operable to measure the linear displacement of the movable rod at its lower end, said measuring device comprising a set of screens positioned face-to-face, each screen comprising alternate translucent and opaque lines directed transversely to the direction of the rods, one screen of the set being secured to the movable rod at its lower end and another screen being fixed, a light source on one side of the screens, and a device for measuring the light that penetrates through the set of screens to the other side thereof.

2. In apparatus as defined in claim 1, the light measuring device comprising a photo-electric voltage generator, a potentiometer for measuring the electricity of the generator, an amplifier connected between the generator and the potentiometer.

3. In apparatus as defined in claim 2, all rods having a like coefficient of thermal-expansion, a furnace containing the specimen and portions of the rods extending away from the specimen for a predetermined distance along their lengths, the potentiometer comprising a recording potentiometer providing a continuous record of the light intensities corresponding with dimensional variations of the specimen, and a recording pyrometer for a continuous record of the specimen temperature during the same time interval as the potentiometer record.

4. In apparatus for measuring dimensional variations of a specimen of solid material, a rigid base, a plurality of fixed rods of like length bearing on the base and projecting upright from the base alongside each other, an abutment plate bearing on the rods and resting on the top ends thereof, a movable rod positioned alongside the fixed rods, the upper end of the movable rod bearing against the bottom of the abutment plate with a specimen of the material between the abutment plate and rod end, an actuating device pressing at the lower end of the movable rod to hold its upper end in bearing engagement with the specimen, a measuring device operable to measure the linear displacement of the movable rod at its lower end, a furnace containing the specimen of material, the device for measuring linear displacement being positioned exteriorly of the furnace, the rods extending from the exterior of the furnace to the interior thereof into engagement with the specimen, all rods having a like coefficient of thermal-expansion, and a heat insulating barrier exteriorly of the furnace located at a point along the lengths of the rods.

5. In apparatus as defined in claim 4, a mount for the furnace comprising guideways for moving the furnace selectively away from the specimen and towards the specimen to position it respectively outside and inside the furnace.

References Cited in the file of this patent

UNITED STATES PATENTS

| | | |
|---|---|---|
| 2,122,818 | Ladrach | July 5, 1938 |
| 2,213,088 | Hahn | Aug. 27, 1940 |
| 2,351,572 | Kingston | June 13, 1944 |
| 2,351,955 | Graf | June 20, 1944 |
| 2,397,971 | Martinec | Apr. 9, 1946 |
| 2,580,498 | Ackerlind | Jan. 1, 1952 |
| 2,596,752 | Williams | Apr. 13, 1952 |

FOREIGN PATENTS

| | | |
|---|---|---|
| 870,813 | France | Dec. 22, 1941 |